US 7,761,870 B2

(12) United States Patent
Westendorf et al.

(10) Patent No.: US 7,761,870 B2
(45) Date of Patent: Jul. 20, 2010

(54) METHODS AND SYSTEMS FOR GENERATING AN APPLICATION CONSISTENT WITH A PROFILE

(75) Inventors: Frank Westendorf, Ubstadt-Welher (DE); Martin Gaub, Wiesloch (DE)

(73) Assignee: SAP AG, Walldorf (DE)

( * ) Notice: Subject to any disclaimer, the term of this patent is extended or adjusted under 35 U.S.C. 154(b) by 1170 days.

(21) Appl. No.: 11/156,661

(22) Filed: Jun. 21, 2005

(65) Prior Publication Data

US 2005/0229174 A1    Oct. 13, 2005

Related U.S. Application Data

(63) Continuation-in-part of application No. 10/642,153, filed on Aug. 18, 2003.

(30) Foreign Application Priority Data

Mar. 6, 2003  (DE) ................... 103 10 998
Mar. 31, 2003 (WO) ................ PCT/EP03/003352

(51) Int. Cl.
    *G06F 9/445* (2006.01)
(52) U.S. Cl. .................. 717/175; 717/121; 717/176
(58) Field of Classification Search ................. None
    See application file for complete search history.

(56) References Cited

U.S. PATENT DOCUMENTS

| 6,282,711 | B1 | 8/2001 | Halpern et al. |
| 6,301,707 | B1 * | 10/2001 | Carroll et al. ............... 717/177 |
| 6,698,018 | B1 * | 2/2004 | Zimniewicz et al. ........ 717/175 |
| 2002/0133814 | A1 | 9/2002 | Bourke-Dunphy et al. |
| 2002/0191014 | A1 | 12/2002 | Hsieh et al. |

FOREIGN PATENT DOCUMENTS

EP    0 802 480 A1    10/1997

OTHER PUBLICATIONS

"Table-Driven Selective Software Download," IBM Technical Disclosure Bulletin, vol. 32, No. 9B, Feb. 1, 1990, pp. 40-41.

* cited by examiner

*Primary Examiner*—Tuan Q Dam
*Assistant Examiner*—Zheng Wei
(74) *Attorney, Agent, or Firm*—Finnegan, Henderson, Farabow, Garrett & Dunner LLP

(57) ABSTRACT

Methods and systems are provided for generating a computer program, wherein the computer program is divided into a plurality of packages in a modular manner, the packages representing in their entirety the complete computer program containing basic functions and additional functions, and being individually selectable by a user when installing the computer program on a computer system in order to create a customized computer program.

10 Claims, 7 Drawing Sheets

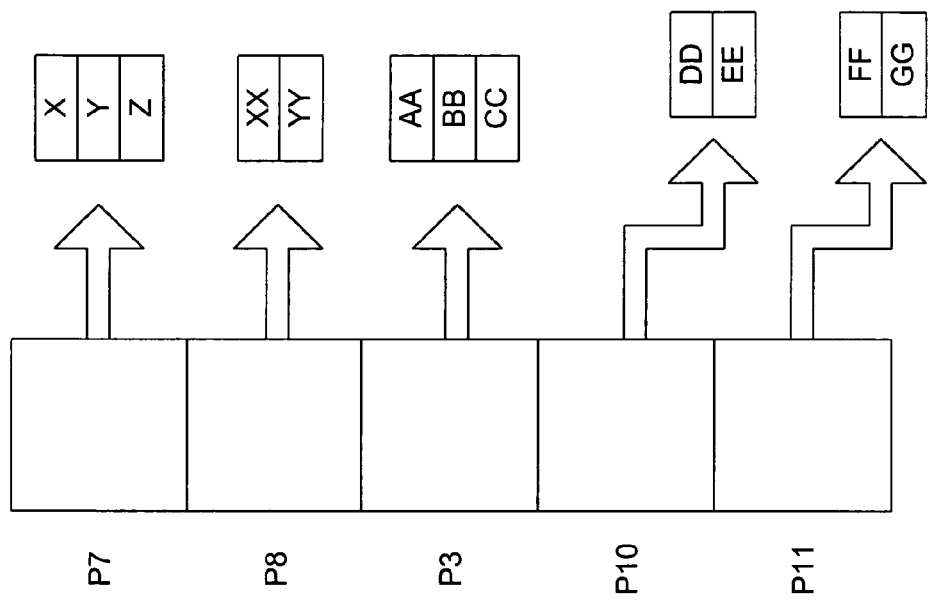

Packages of the Application 600

| Package Stock | | | | | Packages of the Application | | | |
|---|---|---|---|---|---|---|---|---|
| Package | Curr... | Info | Content | Description of Package | Package | Info | Content | Description of Package |
| CACSCD 602 | | | | Settlement through IS-CD 604 | CACS00 | | | Core Package Provisions 608 |
| CRM001 610 | | | | CRM Package 612 | CACS25 606 | | | Scheduling (Temp. Compensation Agr.... 616 |
| | | | | | CACS27 614 | | | Actual Provision 620 |
| | | | | | CACSFI 618 | | | Settlement through FI 624 |
| | | | | | CACSHR 622 | | | Settlement through HR 628 |
| | | | | | CACSSD 626 | | | CACSSD 632 |
| | | | | | FSCS01 630 | | | Package for INSURANCE 636 |

FIG. 6

METHODS AND SYSTEMS FOR GENERATING AN APPLICATION CONSISTENT WITH A PROFILE

RELATED APPLICATION

This application is a continuation-in-part of U.S. patent application Ser. No. 10/642,153, filed on Aug. 18, 2003, the disclosure of which is expressly incorporated herein by reference to its entirety.

FIELD OF THE INVENTION

The present invention generally relates to the field of generating computer programs and, more particularly, the invention relates to methods for generating a computer program which can be easily customized by a user installing the computer program. The invention further relates to a computer program products with a computer-readable medium and computer programs stored on the computer-readable medium with program coding means which are suitable for carrying out such methods when the computer program is run on a computer system.

BACKGROUND INFORMATION

In the field of computer program technology, it is known to pack large computer programs before they are stored on a suitable carrier in case the computer program is too large for the space available on the computer program carrier. In the case of very large programs, it is also known to divide a program into several packages of a size fitting on a given storage carrier. When the computer program is installed, a user loads the content of the more than one data carriers onto his/her computer where the packages are put back together when unpacked in order to generate the computer program on the computer system of the user.

It is also known that a computer program, upon download installation by a user, can be customized. For this, the installation or setup routine of the program comprises an interactive window which can be used by the user to define whether the user wishes standard settings or customized settings to be set up. In cases where the user opts for customized settings, there are computer programs which ask for an extensive amount of setup details to be provided by the user in order to design the desired "shape" of the one version of the computer program to be executed on the user's system.

However, this requires a profound knowledge of the design and the design possibilities of the computer program to be installed on behalf of the user. Further, the customized installation of a complex computer program takes a very long time.

SUMMARY OF THE INVENTION

It is therefore an object of the invention to provide a method for generating and for installing a computer program, as well as a setup system for a computer program, which overcome the disadvantages known in the prior art. More particularly, it is an object of the invention to provide a method for generating and for installing a computer program and a setup system for a computer program which allows a user to generate and design a customized computer program fast and easy and without being required to have profound knowledge of the computer program to be installed. Such objects are achieved by the methods, setup systems, computer program products and related features disclosed herein.

In accordance with embodiments of the present invention, a method is provided for generating and for installing a computer program, wherein the method facilitates all possible parts of the computer program, such as functions, process descriptions, table and/or object design descriptions, table data and/or file data, configuration data, etc.

According to still further embodiments of the invention, a computer program may be divided into a plurality of packages in a modular manner, the packages corresponding to functional subunits of the computer program and representing in their entirety the complete computer program. The packages may be individually selectable by a user when installing the computer program on a computer system in order to create a customized computer program. This allows a user to select whole functional subunits when setting up a computer program, instead of having to select each and every function of the computer program to be "designed", i.e., to be custom-installed. Further, this enables users without detailed knowledge of computer technology and/or a given computer program to generate a customized computer program as they merely have to choose from modular packages corresponding to functional subunits of the computer program, thus allowing for fast, easy and reliable design setup of a customized computer program.

Advantageously, the plurality of packages, may comprise at least one core package and at least one additional package. The core package may represent a base computer program module forming the basis for add-on computer program modules contained in the additional package(s). This allows an inexperienced user to setup a computer program correctly by selecting base modules first and subsequently building up the customized computer program by choosing add-on modules. In a preferred embodiment, each computer program comprises exactly one core package which is the basic subunit of the computer program and provides all the basic functions of the computer program, the core package being able to be installed and run independently from the additional packages which provide add-on functions.

In the context of this invention, the term "to install" is to be understood in the sense of setting up a computer program on a user's computer or computer system. Particularly, the term "to install" in the context of this invention is aimed to describe the action a user is taking in order to create his/her customized computer program application on the basis of the modularly built up program according to the invention, the latter being already loaded down on the user's system with all its plurality of packages and serving the user to create at his/her discretion one or more customized computer program applications according to his/her wishes. Thus, embodiments consistent with the invention can treat the manner how to setup or how to configure a computer program divided into a plurality of packages that is already resident on a user's computer.

Further features and embodiments of the present invention will become apparent from the description and the accompanying drawings.

It will be understood that the features mentioned above and those described hereinafter can be used not only in the combinations specified, but also in other combinations or on their own, without departing from the scope of the present invention.

The invention is schematically illustrated in the drawings by means of exemplary embodiments and is hereinafter explained in detail with reference to the drawings. It is understood that the description is in no way limiting on the scope of the present invention and is merely an illustration of exemplary embodiments of the invention.

BRIEF DESCRIPTION OF THE DRAWINGS

In the drawings:

FIG. 4 is a schematic illustration of exemplary customizations available to packages generating the application of FIG. 3, consistent with embodiments of the invention;

FIG. 6 is a schematic illustration of exemplary customization selections, consistent with embodiments of the invention.

DETAILED DESCRIPTION

Figure 1:
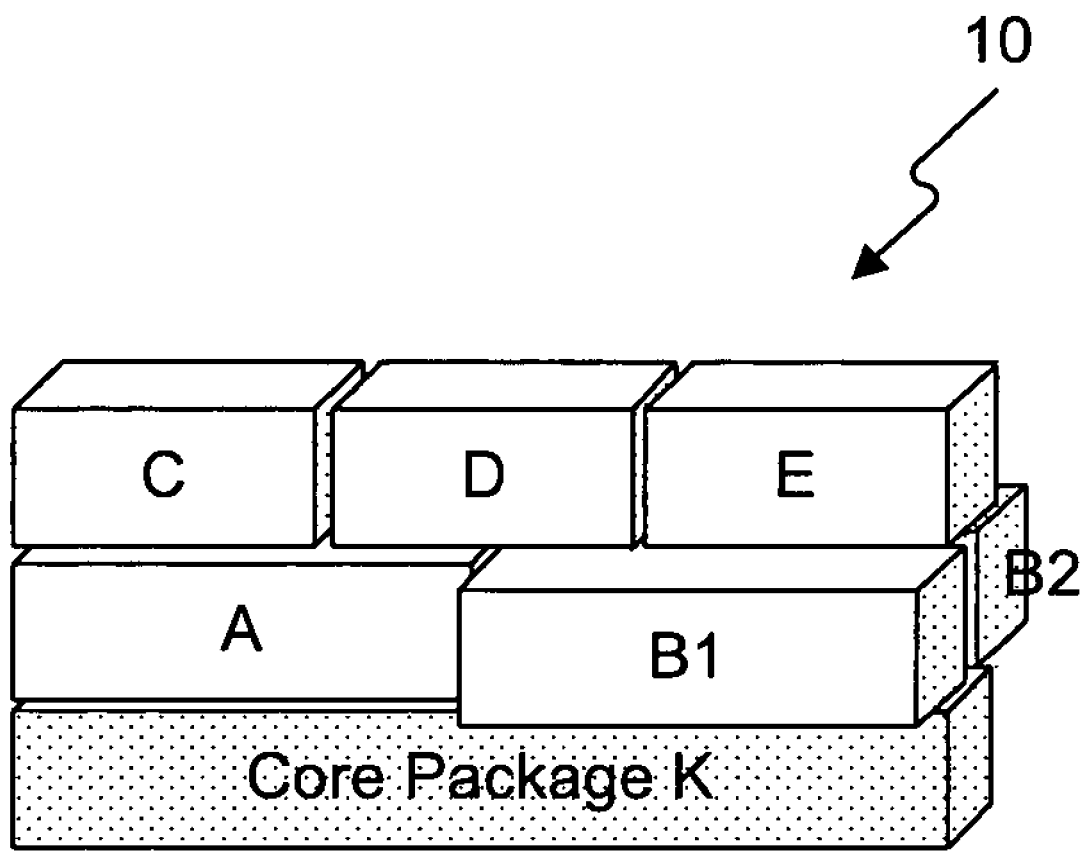
FIG. 1 is a schematic illustration of a computer program divided into a plurality of modular packages, consistent with embodiments of the invention.

FIG. 1 shows in schematic representation a computer program 10, consistent with embodiments of the invention. The computer program 10 is divided into a plurality of packages in modular manner. In the embodiment shown in FIG. 1, the computer program 10 consists of a core package K and additional packages A, B1, B2, C, D and E. Packages K and A to E represent in there entirety the complete and full computer program with all possible functions, each package comprising a functional subunit of the computer program. Each subunit of the computer program may include a multitude of functions and contain customizing rules.

Core package K may represent the smallest independent functional subunit of the computer program 10, i.e., the computer program 10 could be installed by only selecting the core package K and would then constitute a customized computer program stripped down to its basic functions.

In the additional packages A to E, all optional functions and subunits of the computer program are contained.

Core packages do not require any other packages and constitute, as described above, independent software solutions. Advantageously, a computer program according to one embodiment the invention comprises exactly one core package which determines the nature of the computer program. This means that core packages cannot be combined with other core packages, but only with additional packages. This makes the setup of a customized computer program very easy for a user. Each of the additional packages requires at least one further package, i.e., a core package or another additional package. Selection of the additional packages determines the scope of the software solution. However, it is also possible to provide a computer program with more than one core package, which would then allow for a user to choose between different sets of basic functions.

Packages can have various relations as to prerequisites or conditions, with a more complex logic being allowed. For example, in the embodiment of FIG. 1, core package K is a prerequisite for additional package A (A$\Rightarrow$K), or in other words additional package A requires core package K. Further, additional package C requires additional package A (C$\Rightarrow$A), additional package E requires either additional package B1 or B2 (E$\Rightarrow$B1 $\vee$B2) and additional package D requires additional package A and either additional package B1 or additional package B2 (D$\Rightarrow$A $\wedge$(B1 $\vee$B2)). There is also the possibility that two packages bar each other as it is the case for additional packages B1 and B2 in the example of FIG. 1 ( $\neg$(B1 $\wedge$B2) or B1$\Rightarrow$$\neg$B2, B2$\Rightarrow$$\neg$B1). While the bar is symmetrical, the prerequisite is anti-symmetrical, i.e., two packages may not require each other.

If an overlap results in the content of two packages, there might be a conflict when both packages are selected. There are three remedies or options to such a conflict which can find use alternatively or cumulatively. The first option is to prohibit concurrent selection of certain packages. Incompatible packages, like packages B1 and B2 in the example of FIG. 1, may have unlimited overlap. A second option is to implement rules of dominance, e.g., for packages of different status or rank (as for example packages A and C in the example of FIG. 1) it applies that the higher package (here: C) dominates and may modify settings of the lower package (here: A). The third option consists in prohibiting overlaps for packages of the same status or rank (e.g., packages C and D in the example of FIG. 1).

Figure 2:
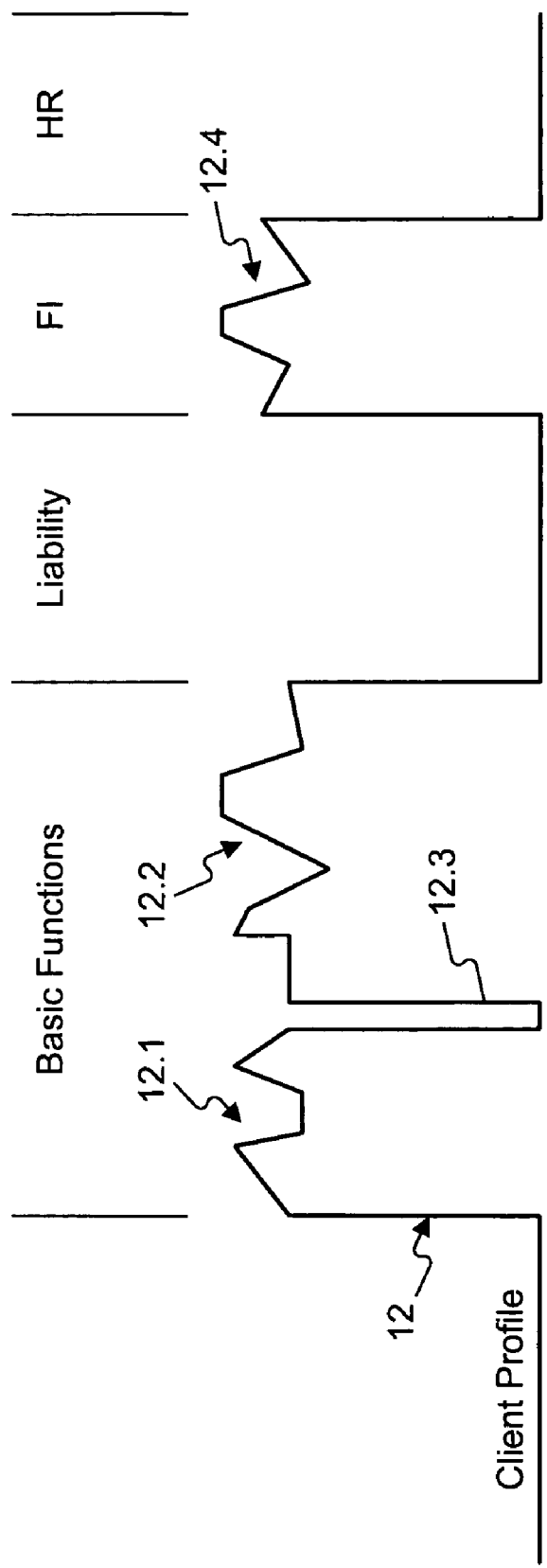
FIG. 2 is a schematic illustration of a requirement profile of a user towards a computer program, consistent with embodiments of the invention.
Figure 3:
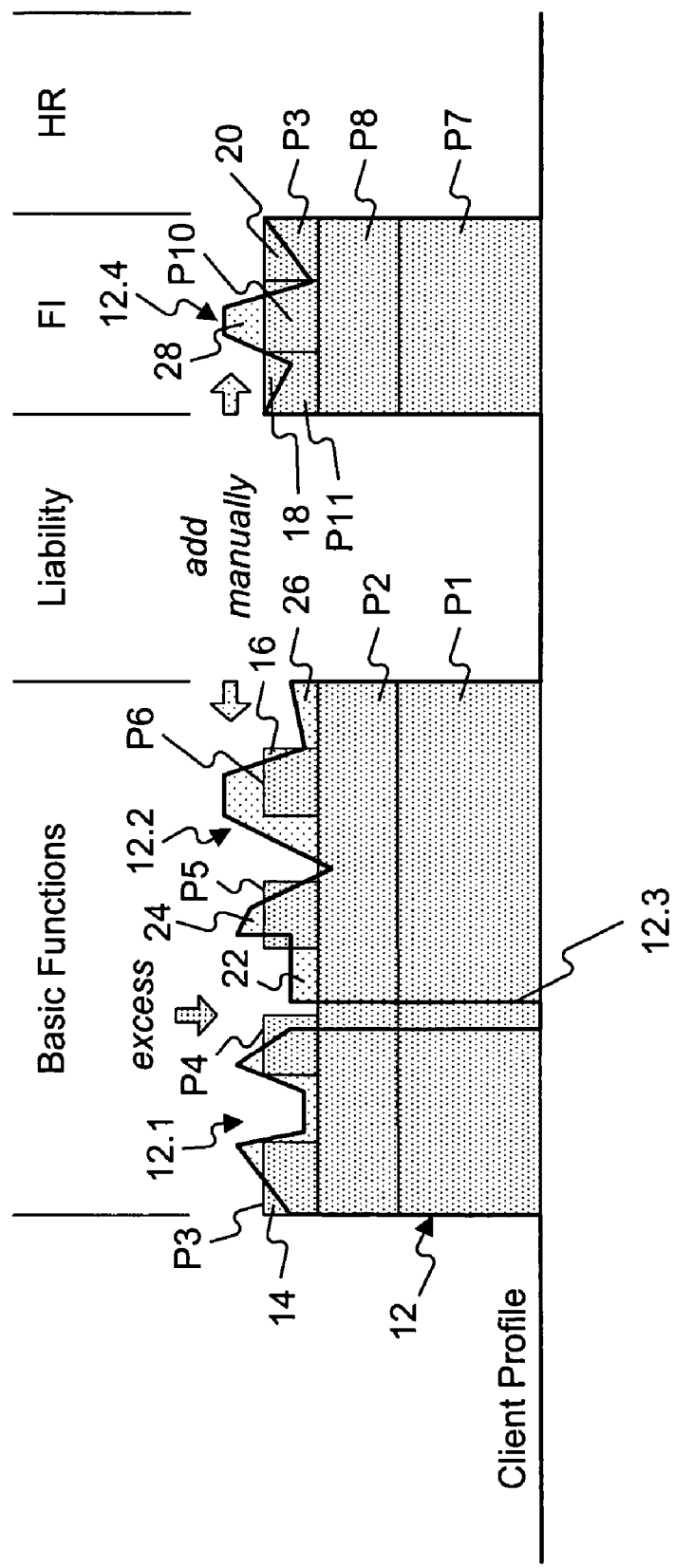
FIG. 3 is a schematic illustration of how the requirement profile of FIG. 2 may be met with a customized computer program generated according to embodiments of the invention.

Referring now to FIGS. 2 and 3, FIG. 2 shows a schematic client profile 12 representing the requirement of a client or user as to the desired functions of the software to be installed and customized. In the example of FIG. 2, the software to be installed is a computer program in the field of commission payments offering basic functions as well as functions in the fields of Liability, Finance (FI) and Human Resources (HR). According to the client requirement profile of FIG. 2, the client desires certain basic functions 12.1 and 12.2, however with a gap 12.3 in the profile of the basic functions which means that the client does not need the function(s) corresponding to the gap 12.3. In the fields of Liability and HR, the profile is flat which means that the client does not wish any function in these fields. However, in the field of FI, the client wishes to have functions according to a profile 12.4.

In order to generate a computer program corresponding as close as possible to the profile 12 of FIG. 2, the client or user selects certain packages when installing or setting up the computer program. First, as illustrated in FIG. 3, the user selects a core package of the computer program which is package P1, and subsequently selects a first additional package P2 which builds up on the core package P1. With these two packages, the main portion of the desired basic functions is already available. However, in order to reproduce the fine profile 12.1 and 12.2 of the basic functions, user further selects smaller additional packages P3, P4, P5 and P6 (the packages are shown as rectangles and squares which is for illustrated purposes only).

In the fields of Liability and HR, the user does not select any packages, but in the field of FI the user selects a first package P7 which provides for the basic functions of the Finance module and further additional packages P8, P3, P10 and P11 in order to reproduce as finely as possible the profile 12.4.

As can easily be seen from the illustration of FIG. 3, it is barely possible to reproduce a fine profile by means of (rectangular) packages. The result is that in some areas there are excess functions (i.e., functions on top of the desired profile) available as for example in the gap 12.3 or in the areas depicted with reference numerals 14, 16, 18 and 20, and in other areas functions which were required are missing as these functions are not covered by the selected packages, as for example in the areas depicted with reference numerals 22, 24, 26 and 28.

The functions missing could be added in a conventional manner by selecting these functions from a menu containing all available functions one after the other (assuming that the software basically provides these functions), and the excess functions could be left or—in case they waste valuable storage—could be de-installed in a conventional manner by choosing the corresponding functions from a menu of all functions one after the other.

Advantageously, the process of setting up a computer program according to embodiments of the invention may be designed to be very user-friendly by providing, for example, a list of all packages of the computer program to the user who can select (via an appropriate device like keyboard or mouse) the desired packages, with the selected packages appearing in a second list. Once the user has begun to select packages, indication elements appear next to the remaining packages in the list of available packages, indicating whether a package can be selected additionally to the packages already selected, whether a package requires further packages and/or whether a package is incompatible with a package already selected.

Embodiments of the invention thus provide a useful tool in generating computer programs and installing such a computer program in order to create a customized computer program. Handling for users, particularly for inexperienced users, is simplified and setup time is minimized. Due to the modular concept of the packages constituting the computer program in contrast to the "atomised" design of conventional custom setup systems.

Embodiments of the invention may enable a user to load a program with its modular packages on his/her computer or computer system and, in a next step, create or set up various applications according to his/her needs on the basis of the modular design of the computer program, consistent with the invention. Thus, "to install" the computer program consistent with one aspect of the invention means to create and configure a customized application, which creation can be repeated several times in order to create several distinct customized applications which can co-exist and be run on the same system.

A customized application may consist of an application generated by choosing various packages to meet a profile, as described above, and adding various customizations, or add-ons to the application. An add-on may be dependent on the packages chosen for the profile. For example, with regard to FIG. 1, the same add-ons may not be available for one application consisting of package K, A, and C as for an application consisting of K, B1, and E. The add-ons may also be specific to each package that makes up the application.

FIG. 4 is a schematic illustration of exemplary customizations available to packages generating the application of FIG. 3, consistent with embodiments of the invention. The packages in FIG. 4 are only a few of the packages used to generate the application of FIG. 3. With regard to the application generated in FIG. 3, once a user has configured the application by choosing various packages to meet the profile of FIG. 2, the user may further customize the application upon download. For example, once the user has chosen packages P7, P8, P10, P3, and P11 relating to the field of FI, the user may be able to further customize the application by choosing various "add-ons" available to one or more of these packages. Package P7 may be associated with add-ons "X," "Y," and "Z," package P8 with "XX" and "YY," package P3 with "AA," "BB," and "CC," package P10 with "DD" and "EE," and package P11 with "FF" and "GG." The user may choose any of these add-ons and save this application on the network. The user may also download all the packages to meet a profile to a server, for example packages p7, p8, p10, p3, and p11, and subsequently customize the application after download.

Each customized application may be stored as a persistent object in-the network. A user may be able to create as many customized applications as desired without losing the possibility of later adjustments per application. A user may therefore regenerate a previously customized application, reconfigure a previously customized application, or generate a new application with new customizations. If a user regenerates a previously customized application, the user may change the customizations and this new application may also be stored as a persistent object on the network.

For example, a user may choose to customize the application of FIG. 2 and choose add-ons "XX," "YY" and "DD." The user may then save this customized application as "application 1." If a user regenerates "application 1," the user has the ability to change any of the customizations, and store this new customized application as a persistent object on the network. The user may delete customization "XX" and add on "FF" and "GG." The user may then save this new application as "application 2." The user may also regenerate "application 1" as many times as desired without changing any of the customizations.

Figure 5A:
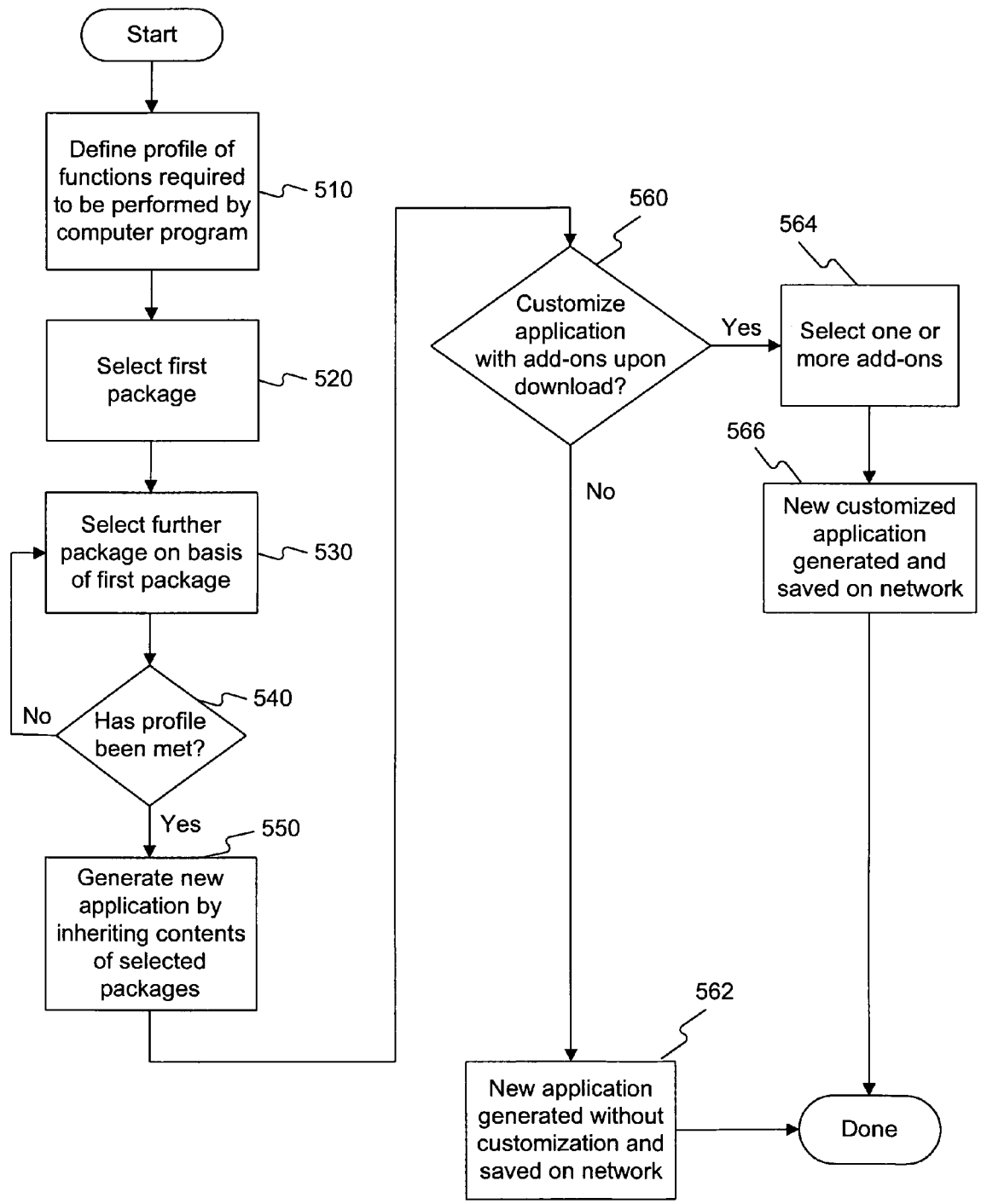
FIG. 5A is a schematic illustration of an exemplary method of generating the application of FIG. 3, consistent with embodiments of the invention.

FIG. 5A is a schematic illustration of an exemplary method of generating the application of FIG. 3, consistent with embodiments of the invention. As illustrated in FIG. 5A, a user may first define a profile representing the requirements of a client or user as to the desired functions of the software to be installed and/or customized (stage 510). Various approaches may be used to define the profile. For example, the profile may be defined using a Graphical User Interface (GUI). Such a GUI may prompt a user to answer a set of questions or select desired features or functions which may be grouped according to, for example, fields of business or use. In another embodiment, the profile may not be defined using a GUI. Instead, the profile is known by the user setting up the profile.

After defining a profile, the user may select a core package of the computer program (stage 520) and subsequently select an additional package on the basis of the core package that was selected(stage 530). Based on the selected core package and additional package, an analysis may be made as to whether the functions of the defined profile have been met. If the functions associated with the core package and the additional package do not satisfy the defined profile (stage 540), the user may select another additional package (stage 530). The user may keep selecting additional packages until the functions of the packages satisfy the functions of the defined profile. In another embodiment where the profile is known by the user and not defined using a GUI, a computer system may prompt the user to determine if the profile has been met and, if not, what additional packages need to be selected to satisfy the profile known by the user. In this embodiment, the computer 'system may keep prompting the user until the user has determined that all of the functions of the profile known by the user have been met.

In one embodiment, the dependencies of the additional packages on the core package may be recorded and/or stored in a table, and these dependencies may be used to control the additional selections available to the user (step 530). Once each function of the profile is represented by a function in at least one of the selected packages, the profile chosen by the user is then satisfied (cf. FIG. 3). A new application is then generated once the defined profile is met by inheriting the contents of all of the selected packages (stage 550).

The user may further determine whether to customize the application with one or more "add-ons" upon download of the application(stage 560). If the user decides to further customize the application, then the user may choose one or more add-ons available to each of the packages (stage 564). For example, with regard to the table of FIG. 6, if a user were to choose package 602 to meet a profile, the user may further customize the application by choosing the add-on 606. If the user chose package 610 to meet the profile, the user may further customize the application by selecting one or more of the add-ons 614, 618, 622, 626, 630, and 634. A new customized application is then generated and saved as a persistent object in the network, i.e. stored in a file system, database or similar storage mechanism (stage 566). If the user decides not to customize the new application in stage 560, then a new application is generated, without customization, by inheriting the contents of all of the selected packages (stage 562) which satisfy the profile the user defined. This new application is then saved as a further persistent object on the network. A repository or name server mechanism may be used to administer the names to each application saved on the network. Various naming conventions can be used to separate vendors' name space from a customer's name space.

Figure 5B:
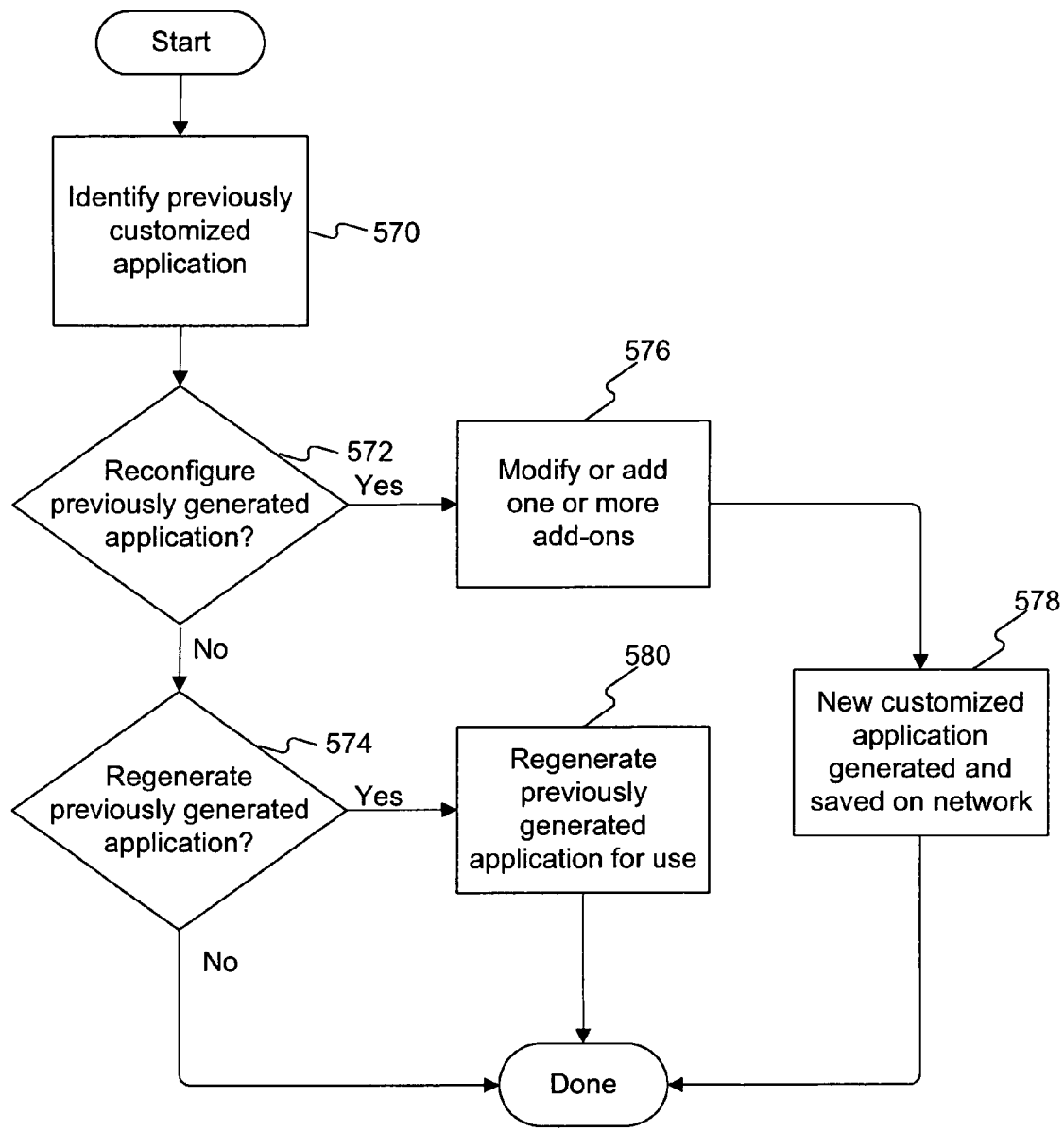
FIG. 5B is a schematic illustration of an exemplary method of reconfiguring or regenerating a previously customized application.

FIG. 5B is a schematic illustration of an exemplary method of reconfiguring or regenerating a previously customized application. First, a user may identify a previously customized application (stage 570). Various approaches may be used to identify a previously customized application. For example, a GUI may be used to allow the user to enter the name of a previous application, and/or the GUI may allow a user to search and identify a previously customized application by name. The user may then indicate whether he/she wishes to reconfigure a previously customized application (stage 572). To reconfigure a previously customized application, the user may select additional add-ons for the previously customized application that was saved on the network, or the user may decide to change or delete the add-ons that are already a part of this previously customized application (stage 576). A new customized application is then generated based on these reconfigurations and the user may save this new customized application as another persistent object in the network (stage 578). If the user does not wish to reconfigure a previously generated application, then the user may decide to regenerate a previously customized application (stage 574). To regenerate a previously customized application, the user may download and install an application that was previously generated and saved as a persistent object on the network(stage 580). This may performed in a similar manner to that described above for stage 566.

FIG. 6 is a schematic illustration of exemplary customization selections, consistent with embodiments of the invention. Package 602 is associated with the add-on 606. Package 610 is associated with the add-ons 614, 618, 622, 626, 630, and 634. The dependencies of the additional packages on the core package may be recorded and/or stored in a table, and these dependencies may further be used to control the additional selections available to the user. Therefore, if a user were to choose package 602 to meet a profile, the user may further customize the application by choosing the add-on 606. If the user chose package 610 to meet the profile, the user may further customize the application by selecting one or more of the add-ons 614, 618, 622, 626, 630, and 634. The user would not have the option of choosing add-ons 614, 618, 622, 626, 630, and 634 if core package 602 was selected initially because add-ons 614, 618, 622, 626, 630, and 634 are dependent only from package 610.

With embodiments of the invention it also becomes possible to ship parts of a computer program separately, which leads to an enhanced flexibility of a software producer as well as the software client.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM.

It is intended, therefore, that the specification and examples be considered as exemplary only, with a true scope and spirit of the invention being indicated by the following claims and their full scope of equivalents.

What is claimed is:

1. A method of installing a computer program divided into a plurality of packages in modular manner, the packages representing in their entirety the complete computer program and being individually selectable by a user when installing the computer program on a computer system in order to create a customized computer program, the packages being sorted hierarchically, with packages ranking higher in the hierarchy being dependent on and dominating packages ranking lower in the hierarchy, the method comprising:

defining, based on input from the user, a graphical user interface representation of a profile of functions required to be performed by the computer program to be installed;

providing combination restrictions relating to the plurality of packages, the combination restrictions prohibit concurrent selection of packages that are incompatible with each other and prohibit selection of packages of the same rank that contain the same functions of the computer program to be installed;

selecting, based on input from the user and the combination restrictions, a first package of the plurality of packages, the first package being a core package of the computer program to be installed, containing basic functions of the computer program to be installed, and representing an independent functional subunit of the computer program to be installed;

subsequently selecting, based on input from the user and the combination restrictions, a second package which provides additional computer program functions building up on the selected first package without the user customizing settings within the first package or the second package;

comparing the functions of the selected first and second packages to the graphical user interface representation of the profile of functions;

subsequently selecting, based on the combination restrictions, additional packages from the plurality of packages until the functions of the selected packages fit within or exceed the previously defined graphical user interface representation of the profile of functions, wherein the exceeded functions of the selected packages are de-installed in order to reproduce a finely matched profile of functions as the defined graphical user interface representation of the profile of functions;

generating a first computer program based on the selected packages;

subsequently determining, based on input from the user, whether to customize the first computer program; and if it is determined to customize the first computer program, generating a first customized computer program by selecting one or more additional computer program functions available to the selected packages.

2. The method according to claim 1, wherein the first customized computer program is stored as a persistent object in a network.

3. The method according to claim 1 further comprising:

changing the selection of the one or more additional computer program functions available to the selected packages to form a second customized computer program; and storing the second customized computer program as a persistent object in a network.

4. The method according to claim 3, wherein the second customized computer program can be regenerated one or more times.

5. The method according to claim 1, wherein the first customized computer program can be regenerated one or more times.

6. A computer program setup system comprising:

a memory storage for storing a computer program divided into a plurality of packages in modular manner, the packages representing in their entirety the complete computer program and being individually selectable by a user when installing the computer program on a computer system in order to create a customized computer program, the packages being sorted hierarchically, with packages ranking higher in the hierarchy being dependent on and dominating packages ranking lower in the hierarchy;

a user interface for providing instructions to the processor, the user interface:

enabling the user to define a graphical user interface representation of a profile of functions required to be performed by the computer program to be installed;

providing combination restrictions relating to the plurality of packages, the combination restrictions prohibit concurrent selection of packages that are incompatible with each other and prohibit selection of packages of the same rank that contain the same functions of the computer program to be installed;

enabling the user, based on the combination restrictions, to select a first package of the plurality of packages, the first package being a core package of the computer program to be installed, containing basic functions of the computer program to be installed, and representing an independent functional subunit of the computer program to be installed;

enabling the user, on the basis of the first package and the combination restrictions, to subsequently select a second package which provides additional computer program functions building up on the selected first package without requiring the user to customize settings within the first package or the further package; and enabling the user to compare the functions of the selected first and second packages to the graphical user interface representation of the profile of functions;

enabling the user, based on the combination restrictions, to subsequently select additional packages from the plurality of packages until the functions of the selected packages fit within or exceed the previously defined graphical user interface representation of the profile of functions, wherein the exceeded functions of the selected packages are de-installed in order to reproduce a finely matched profile of functions as the defined graphical user interface representation of the profile of functions; and a processor configured to cause a first computer program to be generated based on the selected packages, wherein the user interface further enables the user to customize the first computer program by selecting one or more additional computer program functions available to the selected packages, thereby generating a first customized computer program.

7. The computer program setup system of claim 6, wherein the first customized computer program is stored as a persistent object in a network.

8. The computer program setup system of claim 6, further comprising:

allowing the user to change the selection of the one or more additional computer program functions to form a second customized computer program and to store the second customized computer program as a persistent object in a network.

9. The computer program setup system of claim 8, wherein the second customized computer program can be regenerated one or more times.

10. The computer program setup system of claim 6, wherein the first customized computer program can be regenerated one or more times.

\* \* \* \* \*